(12) United States Patent
Bologna et al.

(10) Patent No.: US 10,579,117 B2
(45) Date of Patent: Mar. 3, 2020

(54) METHOD AND APPARATUS FOR SECURING COMMUNICATION OF INSTRUCTIONS TO MANAGE ANTENNA POWER OUTPUT

(71) Applicant: Dell Products, LP, Round Rock, TX (US)

(72) Inventors: Benny J. Bologna, Austin, TX (US); Kamal J. Koshy, Austin, TX (US); Adolfo S. Montero, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/278,641

(22) Filed: Feb. 18, 2019

(65) Prior Publication Data

US 2019/0179385 A1 Jun. 13, 2019

Related U.S. Application Data

(63) Continuation of application No. 15/667,532, filed on Aug. 2, 2017, now Pat. No. 10,216,241.

(51) Int. Cl.
*G06Q 20/00* (2012.01)
*G06F 1/26* (2006.01)
(Continued)

(52) U.S. Cl.
CPC ............... *G06F 1/26* (2013.01); *G05B 15/02* (2013.01); *G06F 11/2221* (2013.01);
(Continued)

(58) Field of Classification Search
CPC ...... H01Q 1/245; H01Q 1/243; H04B 1/3838; H04B 1/0458; H04B 5/0056;
(Continued)

(56) References Cited

U.S. PATENT DOCUMENTS 7,324,824 B2   1/2008   Smith
8,577,289 B2   11/2013  Schlub
(Continued)

OTHER PUBLICATIONS

Revolution Wi-fi, "Wake on Wireless LAN," Nov. 8, 2010, 6 pages, http://www.revolutionwifi.net/revolutionwifi/2010/11/wake-on-wireless-lan.html?rq=Wake%20on%20Wireless%20Lan.
(Continued)

*Primary Examiner* — Linh V Nguyen
(74) *Attorney, Agent, or Firm* — Prol Intellectual Property Law, PLLC; H. Kenneth Prol

(57) ABSTRACT

A method and an information handling system comprising a processor executing instructions of a basic input/output system (BIOS) module operatively connected to a network interface device standard absorption rate (SAR) antenna power control register via a bus interface and the processor executing code instructions for a power management command for altering a power level of a transmission by an operably connected transmitting antenna according to SAR requirements in response to detection at a sensor indicating a change to transmission power levels is required, where the bus interface is secured by implementing a challenge/response cryptographic system between the BIOS module and the network interface device before allowing the read/write command to access the standard absorption rate control register.

20 Claims, 6 Drawing Sheets

(51) Int. Cl.
*H04B 3/54* (2006.01)
*G05B 15/02* (2006.01)
*G06F 11/22* (2006.01)
*H04L 12/24* (2006.01)
*H04L 12/939* (2013.01)
*H04W 84/12* (2009.01)
*H04L 12/28* (2006.01)

(52) U.S. Cl.
CPC ......... *H04B 3/542* (2013.01); *H04L 41/0663* (2013.01); *H04L 41/0672* (2013.01); *H04L 49/557* (2013.01); *H04B 2203/5441* (2013.01); *H04L 2012/2843* (2013.01); *H04W 84/12* (2013.01)

(58) Field of Classification Search
CPC ............. H04L 2463/102; H04L 63/083; H04L 63/0853; H04L 63/0876; H04L 41/08; H04W 88/02; H04W 12/08; H04W 52/0254; H04W 52/0274; H04W 88/00; H04W 74/00; G06Q 20/341; G06Q 20/3278; G06Q 20/352; G06Q 20/3574; G06Q 20/3576; G06Q 20/3226; G06Q 20/20; G06Q 20/322; G06Q 20/3223
USPC ......................................................... 343/714
See application file for complete search history.

(56) References Cited

U.S. PATENT DOCUMENTS

| | | |
|---|---|---|
| 8,811,918 B2 | 8/2014 | Rath |
| 8,825,102 B2 | 9/2014 | Chakraborty |
| 8,971,826 B2 | 3/2015 | Abdul-Gaffoor |
| 10,009,056 B1* | 6/2018 | Shaw ................... H04B 1/3838 |
| 2005/0270814 A1 | 12/2005 | Oh |
| 2008/0270814 A1 | 10/2008 | Starr |
| 2010/0164720 A1 | 7/2010 | Kore |
| 2010/0264211 A1 | 10/2010 | Jain |
| 2011/0034135 A1 | 2/2011 | Ali |
| 2012/0003933 A1 | 1/2012 | Baker |
| 2012/0093141 A1 | 4/2012 | Imes |
| 2012/0258772 A1* | 10/2012 | Brogle ................. G01D 5/2405 455/556.1 |
| 2013/0067253 A1 | 3/2013 | Tsuda |
| 2013/0156080 A1* | 6/2013 | Cheng ..................... H01Q 1/243 375/222 |
| 2013/0210477 A1* | 8/2013 | Peter ..................... H04W 64/00 455/522 |
| 2013/0217342 A1* | 8/2013 | Abdul-Gaffoor .... H03K 17/955 455/77 |
| 2013/0273870 A1* | 10/2013 | Shi ....................... H01Q 21/245 455/269 |
| 2014/0213192 A1 | 7/2014 | Lagnado |
| 2014/0351654 A1 | 11/2014 | Zhang |
| 2014/0357313 A1 | 12/2014 | Mercer |
| 2015/0044964 A1 | 2/2015 | Khan |
| 2015/0333788 A1* | 11/2015 | Ding .................... H04B 1/3838 455/575.5 |
| 2016/0164563 A1 | 6/2016 | Khawand |
| 2016/0316367 A1 | 10/2016 | Rose |
| 2017/0161724 A1 | 6/2017 | Lau |
| 2017/0164300 A1* | 6/2017 | Lee ........................ H04W 52/18 |
| 2017/0192478 A1* | 7/2017 | Mercer ..................... G06F 1/28 |

OTHER PUBLICATIONS

Kevin Purdy, Lifehacker.com, "Rule Your Computer From Afar be Setting Up Wake-on-LAN," Mar. 29, 2011, 4 pages, http://lifehacker.com/5786791/rule-your-computer-from-afar-by-setting-up-wake-on-lan.

FCC / OET Laboratory Division, "Draft Laboratory Division Publications Report: SAR Evaluation Considerations for Laptop, Notebook, Netbook, & Tablet Computers," Apr. 23, 2012, 13 pages, https://apps.fcc.gov/eas/comments/GetPublishedDocument.html?id=247&tn=760076.

* cited by examiner

METHOD AND APPARATUS FOR SECURING COMMUNICATION OF INSTRUCTIONS TO MANAGE ANTENNA POWER OUTPUT

This application is a continuation of prior application Ser. No. 15/667,532 entitled "Method and Apparatus for Securing Communication of Instructions to Manage Antenna Power Output," filed on Aug. 2, 2017, which is assigned to the current assignee hereof and is incorporated herein by reference in its entirety.

FIELD OF THE DISCLOSURE

The present disclosure generally relates to a system and method of managing voltage supplied to a transmitting antenna based upon proximity of a human body part as detected by a proximity sensor, and more specifically to securing communication of instructions to manage antenna voltage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system may include telecommunication, network communication, and video communication capabilities. Further, the information handling system may include a system or method for power management of power output for antenna systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
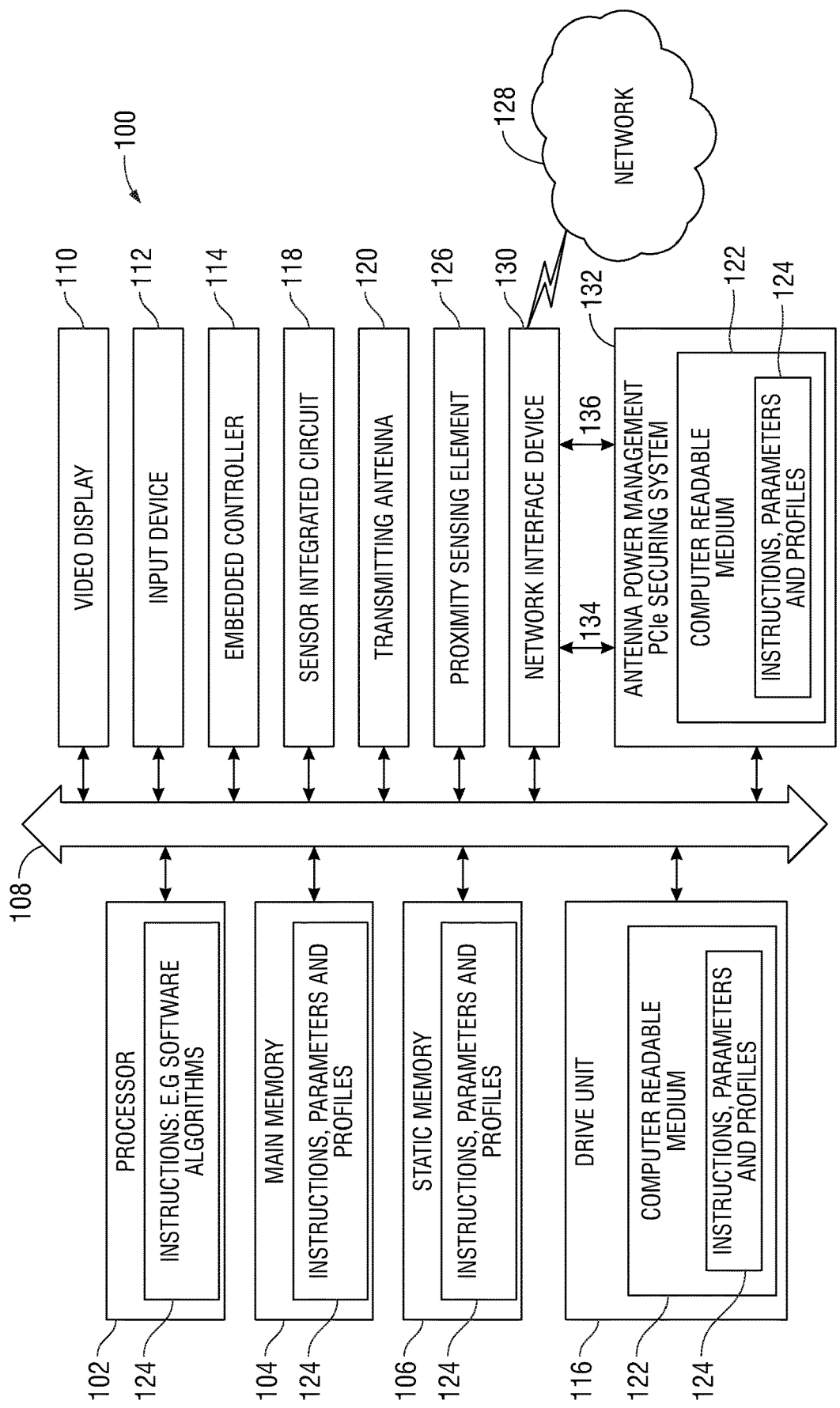
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The Federal Communications Commission (FCC) regulates the strength of radio frequency signals a transmitting antenna within a commercial product sold in the United States may emit, including radio frequencies transmitted in LTE, WiFi, WiGIG, Bluetooth, WLAN, WWAN, and WPAN networks. Higher strength radio frequency signals may result in stronger signals and better communication, but may also increase the specific absorption rate (SAR), or rate at which energy is absorbed by the human body. The FCC requires transmitting antennas within US commercial products to lower the power supplied to the antenna when the antenna is in close proximity to a human body part in order to avoid any increase in SAR. In order to comply with these requirements, many devices compatible with LTE, WiFi, WiGIG, Bluetooth, WLAN, WWAN, and WPAN networks include proximity sensors that may detect nearby human body parts.

Proximity sensors may sense nearby human body parts by detecting a change in an electro-magnetic field generated by the sensor. A proximity sensor may receive a small voltage in order to emit a low-level electromagnetic field. When a human body part comes into close proximity with the proximity sensor, the presence of the body part may change the local electric field, which may also alter the mutual capacitance across the proximity sensor. The proximity sensor may register the capacitance change at one or more locations across its surface in order to determine the position of the human body part with reference to the dimensions of the proximity sensor. Such a proximity sensor may be co-located nearby a transmitting antenna. The transmitting antenna, proximity sensor, and processor of an information handling system may be operatively connected to an integrated circuit that may provide a low-level voltage to the proximity sensor, detect a change in the capacitance field generated by the proximity sensor when a human body part approaches the sensor, and transmit an instruction to decrease the power supply to the nearby transmitting antenna to the BIOS module of the information handling system, in order to comply with FCC regulations.

The BIOS module of an information handling system may receive an instruction to decrease the power supply to the operatively connected transmitting antenna via a secure system management interrupt input output port, and may forward that instruction on to a network interface device operating to control power levels of the operatively connected transmitting antenna via an electronic communication bus, such as, for example, a peripheral component interconnect express (PCIe) interface. The FCC regulations requiring dynamic power reduction discussed above also require that antenna power levels be protected from first level hacking attacks. The weakest point of attack for a first level hacking attack is the control registers accessible via the PCIe interface or interface of other electronic buses. A solution is needed to strengthen and protect against first level hacking attacks targeting the PCIe interface between the BIOS module and the network interface device of an information handling system.

Embodiments of the present disclosure provide a solution to this problem by requiring entities attempting to communicate antenna power level instructions to the network interface device, including the BIOS module of the same information handling system as the network interface device to provide a response value calculated based on a challenge value positively identifying the entity as the BIOS module. The response value in embodiments of the present disclosure may be determined based on a randomly generated challenge number value stored in a memory accessible by the network interface device and the BIOS module of an information handling system by an antenna power management PCIe security system operating within the network interface device. Once the entity establishing communications in embodiments of the present disclosure provides a response value matching the response value determined by the antenna power management PCIe security system by storing it in the memory, the antenna power management PCIe security system may allow the BIOS module to perform a single read/write operation to a SAR control register also stored in the memory, within a preset duration of time. If the BIOS module stores the antenna power level instruction to the SAR control register within the preset duration of time in response, the antenna power management PCIe security system in embodiments of the present disclosure may then read the stored antenna power level instruction in the SAR control register, and execute the instruction to alter the antenna power level, thus meeting the FCC regulations. However, if the entity communicating antenna power level instructions cannot provide a response value matching the response value determined by the antenna power management PCIe security system, or cannot write directly to the SAR control register within the allotted preset time period after providing the proper response value, the antenna power management PCIe security system in embodiments of the present disclosure may block any attempts by any entity to perform read/write operations to the SAR control register. In such a way, embodiments of the present disclosure may protect the weakest point of attack in an information handling system—the control registers accessible via the PCIe (or other electronic communication bus) interface between a BIOS module and a network interface device—from a first level hacking attack. An antenna power management PCIe security system may also be referred to as an antenna power management communication bus security system herein to reflect that any communication bus used may be secured by the embodiments herein. Although an antenna power management PCIe security system is described in various embodiments, it is understood that the embodiments herein may be used to secure other communication buses for antenna power management in various embodiments.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. In a networked deployment, the information handling system 100 may operate in the capacity of a server or as a client user computer in a server-client user network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more disk drives, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. The antenna power management PCIe security system of various embodiments of the present disclosure may operate in some example embodiments as a software agent, in whole or in part, within a gateway device, other wireless network access point, mobile information handling system, or stationary information handling system. Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the antenna power management PCIe security system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or another type of display. Additionally, the information handling system 100 may include an input device 112, such as a keyboard, and/or a cursor control device, such as a mouse, touchpad, or gesture or touch screen input.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, or a mobile smartphone.

Network interface device 130 represents a NIC disposed within information handling system 100, on a main circuit board of the information handling system, integrated onto another component such as processor 102, in another suitable location, or a combination thereof. The network interface device 130 can include another information handling system, a data storage system, another network, a grid management system, another suitable resource, or a combination thereof. Network interface device 130 in an embodiment may operably connect to a network 128. Connection to network 128 may be wired or wireless.

The network interface device 130 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 130 may operate in accordance with any wireless data communication standards including but not limited to LTE, WiFi, WiGIG, Bluetooth, WLAN, WWAN, WPAN, and any emerging wireless standards. To communicate with a wireless local area network, standards including IEEE 802.11 WLAN standards, IEEE 802.15 WPAN standards, WWAN such as 3GPP or 3GPP2, or similar wireless standards may be used. The network interface device 130 may connect to any combination of macrocellular wireless connections including 2G, 2.5G, 3G, 4G, 5G or the like from one or more service providers. The network interface device 130 can represent an add-in card, wireless network interface module that is integrated with a main board of the information handling system or integrated with another wireless network interface capability, or any combination thereof.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, instructions 124 may execute an antenna power management PCIe security system, software agents, or other aspects or components. Similarly instructions 124 may execute the antenna power management PCIe security system disclosed herein for securing PCIe communication of instructions to alter the power output of the transmitting antenna 120 from the BIOS module of the information handling system 100 to the network interface device 130, as described in greater detail below. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. Main memory 104 may include, but may not be limited to non-volatile random access memory. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory.

Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 130 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another. The BIOS/FW in an embodiment may perform tasks related to regulating the power or voltage supplied to the transmitting antenna 120 based on a drop in capacitance detected along the proximity sensing strip 126 by the integrated circuit 118.

The transmitting antenna 120 in an embodiment may comprise an antenna capable of transmitting radio frequency communications. It is contemplated the transmitting antenna 120 may be capable of transmitting radio frequency communications in any specified band, including, but not limited to frequencies associated with the LTE, WiFi, WiGIG, Bluetooth, WLAN, WWAN, and WPAN standards, and any other forthcoming standards, as defined by the FCC. In other embodiments, the transmitting antenna 120 may be capable of transmitting radio frequency communications within only a limited subset of the LTE (or other standard) band space, such as for example, low band LTE, or high band LTE. In still other embodiments, the transmitting antenna 120 may be capable of both transmitting and receiving radio frequency communications, thus operating as a transceiving antenna. More than one transmitting antenna 120 may be present in the embodiments of the present disclosure.

The proximity sensing strip 126 in an embodiment may include one or more capacitive strips, and may receive a small voltage from the integrated circuit 118 in order to emit a low-level electro-magnetic field. When a human body part comes into close proximity with the proximity sensing strip 126, the presence of the body part may change the local electric field of the proximity sensing strip 126, which may also alter the mutual capacitance across the proximity sensor 126 capacitive strips. The sensor integrated circuit 118 in an embodiment may detect such alterations in the mutual capacitance across the proximity sensor 126. The proximity sensor 126 may be mounted in any location and take any form on an information handling case 202. The proximity sensing strip 126 in an embodiment may lie flush with the exterior surface of a chassis enclosing the information handling system, and may be co-located with the transmitting antenna 120.

In other embodiments, proximity sensors other than mutual capacitance proximity sensors may be used to detect the proximity of a human body part nearby a transmitting antenna, including, but not limited to a camera, an infrared sensor, or any other power modification triggering input. Other power modification triggering inputs in embodiments may include, but may not be limited to detection of configuration changes, detection of activity between the transmitting antennas of the information handling system and outside transmitting antennas, detection of a person touching a screen of the information handling system, docking of the information handling system with a power source, and any other input indicating a situation in which it is predetermined a change in transmitting antenna power may be needed.

The integrated circuit 118 in an embodiment may be operatively connected to the transmitting antenna 120 and to the proximity sensing strip 126. The integrated circuit 118 in an embodiment may supply low-level voltage to the proximity sensing strip 126, in order for the proximity sensing strip 126 to emit a capacitance field, and may detect changes in the capacitance field of the proximity sensing strip 126. The integrated circuit 118 in an embodiment may also transmit instructions to the BIOS/FW of the information handling system via the embedded controller 114 to decrease the power level supplied to the transmitting antenna 120 upon detection by the proximity sensing strip 126 of a nearby human body part.

The embedded controller 114 in an embodiment may receive general purpose input/output (GPIO) signals or inter-integrated circuit ($I^2C$) bus signals from the integrated circuit 118, including instructions to alter the power output of the transmitting antenna 120. The embedded controller 114 in an embodiment may translate an instruction received via GPIO, or $I^2C$ ports, or other electronic communication bus available to the embedded controller 114 into a secure system management interrupt signal that may be transmitted and understood by the BIOS/FW module in an embodiment.

The disk drive unit 116 and the antenna power management PCIe security system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the antenna power management PCIe security system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the antenna power management PCIe security system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna power management PCIe security system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored. The antenna power management PCIe security system 132 in an embodiment may operate to secure access to control registers receiving antenna power management instructions via a PCIe interface and/or via an interface of any other form of electronic communication bus.

The antenna power management PCIe security system 132 computer readable medium 122 may also contain space for data storage. The information handling system 100 may also include an antenna power management PCIe security system 132 that may be operably connected to the bus 108. In an embodiment, the antenna power management PCIe security system 132 may communicate with the main memory 104, the processor 102, the video display 110, the input device 112, the embedded controller 114, the drive unit 116, the sensor integrated circuit 118, the transmitting antenna 120, the proximity sensing element 126, and the network interface device 130 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
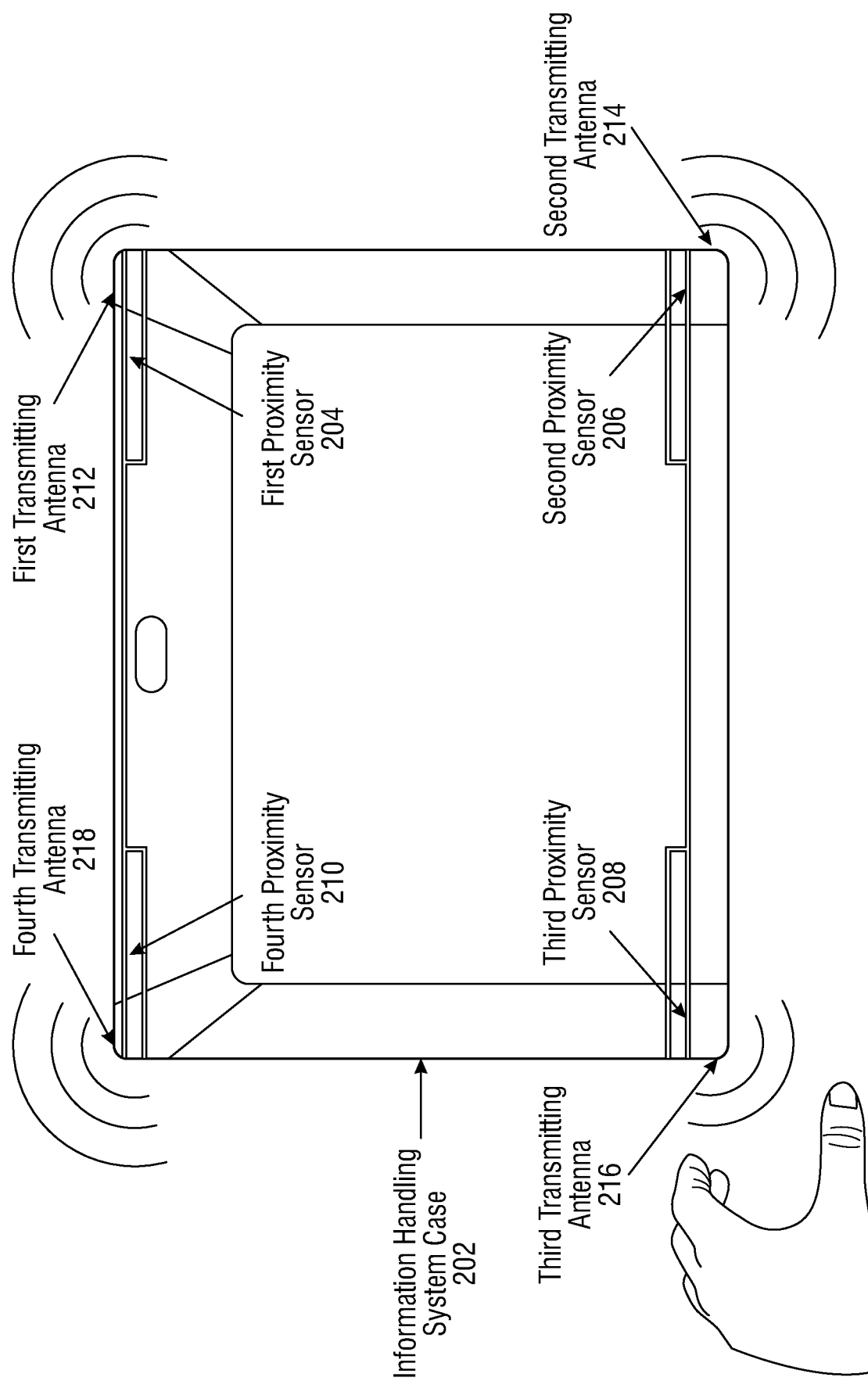
FIG. 2 is a graphical diagram illustrating a proximity sensing element according to an embodiment of the present disclosure.

FIG. 2 is a graphical diagram illustrating a proximity sensing element detecting proximity of a human body part nearby a transmitting antenna according to an embodiment of the present disclosure. As shown in FIG. 2, the information handling system of the present disclosure may be enclosed within a case 202 and comprise more than one transmitting antennas, including a first transmitting antenna 212, a second transmitting antenna 214, a third transmitting antenna 216, and a fourth transmitting antenna 218 and one or more proximity sensing strips, including a first proximity sensor 204, a second proximity sensor 206, a third proximity sensor 208, and a fourth proximity sensor 210. As an example, and as shown in FIG. 2, each transmitting antenna 212-218 in an embodiment may be located near one of the proximity sensors 204-210. Each of these antennas 212-218 may transmit radio frequencies in LTE, WiFi, WiGIG, Bluetooth, WLAN, WWAN, and/or WPAN networks, and thus, may be subject to the FCC regulations on specific absorption rate (SAR) described above.

In an embodiment, each proximity sensor may function to detect the presence of a human body party nearby one of the transmitting antennas. For example, and as shown in the top view of an information handling system case 202 in FIG. 2 (in which the front of the information handling system case 202 is oriented toward the bottom of the drawing), the first proximity sensor 204 may function to detect the presence of a human body part nearby the first transmitting antenna 212 located at the right rear side of the information handling system case 202, the second proximity sensor 206 may function to detect the presence of a human body part nearby the second transmitting antenna 214 located at the right front side of the information handling system case 202, the third proximity sensor 208 may function to detect the presence of a human body part nearby the third transmitting antenna 216 located at the left front side of the information handling system case 202, and the fourth proximity sensor 210 may function to detect the presence of a human body part nearby the fourth transmitting antenna 218 located at the left rear side of the information handling system case 202. In an example embodiment in which the third proximity sensor 210 is located nearby the third transmitting antenna 216, an integrated circuit of the information handling system may detect a change in capacitance across the third proximity sensor 210 when a human hand comes in close contact with the third proximity sensor 210 and the third transmitting antenna 216, as shown in FIG. 2. In such an example embodiment, the integrated circuit may sense this drop in capacitance and respond by transmitting instructions to the BIOS module of the information handling system to decrease the power supplied to the transmitting antenna, in order to comply with FCC regulations.

Figure 3:
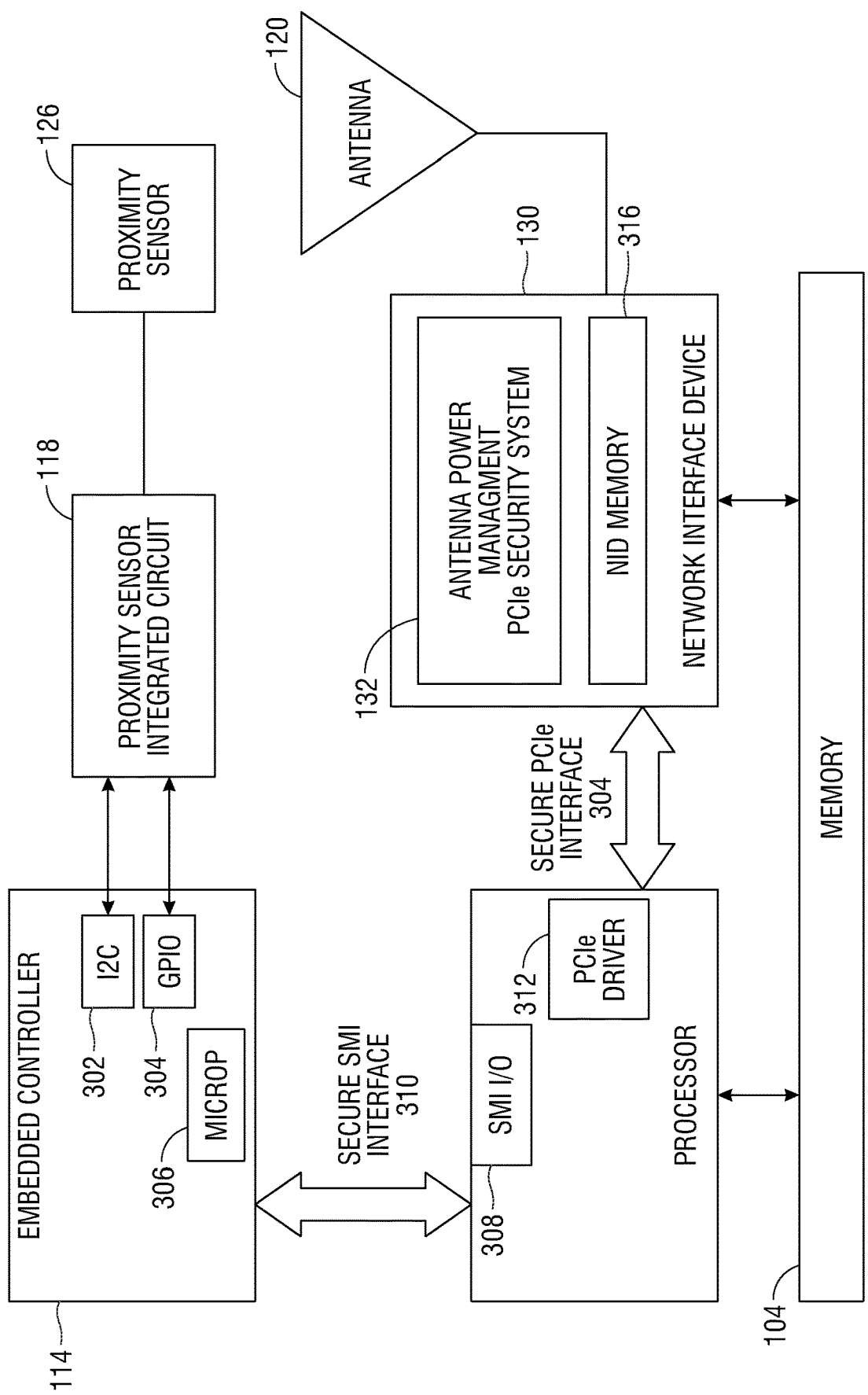
FIG. 3 is a block diagram illustrating a secure communication bus interface according to an embodiment of the present disclosure.

FIG. 3 is a block diagram illustrating a secure electronic bus interface between a BIOS module and a network interface device according to an embodiment of the present disclosure. As described above, the proximity sensing strip 126 in an embodiment may receive a small voltage from the integrated circuit 118 in order to emit a low-level electromagnetic field. When a human body part comes into close proximity with the proximity sensing strip 126, the presence of the body part may change the local electric field of the proximity sensing strip 126, which may also alter the mutual capacitance across the proximity sensor 126. The sensor integrated circuit 118 in an embodiment may detect such alterations in the mutual capacitance across the proximity sensor 126, and may transmit instructions to the BIOS/FW of the information handling system via the embedded controller 114 to decrease the power level supplied to the transmitting antenna 120 in response. In such a way, the proximity sensor integrated circuit 118 in an embodiment may ensure compliance with FCC regulations directing power adjustments for output of transmitting antennas in the presence of human body parts.

As shown in FIG. 3, the embedded controller 114 in an embodiment may receive general purpose input/output (GPIO) signals or inter-integrated circuit (VC) bus signals from the integrated circuit 118, including instructions to alter the power output of the transmitting antenna 120. The embedded controller 114 in an embodiment may receive an instruction via an I$^2$C port 302 or a GPIO port 304 and transmit the instruction to a microprocessor 306 of the embedded controller 114, for translation into a secure system management interrupt signal that may be transmitted and understood by the processor 102 in an embodiment. In other embodiments, electronic communication buses other than GPIO and I$^2$C may be used.

The embedded controller 114 in an embodiment may transmit a secure system management interrupt (SMI) instruction to lower the power output of the transmitting antenna 120 to a system management interrupt input/output (SMI I/O) port 308 of the processor 102 via a secure SMI interface 310. The BIOS/FW code instructions of the information handling system may receive the SMI instruction and instruct execution of the received signal by the processor 102, as described in greater detail below. The BIOS/FW code instructions may further operate, alone or in conjunction with other components such as drivers, to translate the system management interrupt instruction into an instruction that may be transmitted via a PCIe port 312. The processor 102 in an embodiment may then transmit the SMI instruction to the network interface device 130 via the secure PCIe interface 314. In other embodiments, the secure PCIe interface may be a secure electronic communication bus of any type other than PCIe. In such embodiments, the (SMI I/O) port 308 may be in communication with a port (not shown) operable to establish an interface with the secure electronic bus of the type other than PCIe, and the SIM instructions may be transmitted to the network interface device 130 via that port (not shown).

The network interface device 130 in an embodiment may comprise an antenna power management PCIe security system 132 and may control power levels supplied to the transmitting antenna 120, as per FCC regulations. Upon receiving a PCIe transmission of the instruction to decrease the power output of the transmitting antenna 120, the network interface device 130 may execute the instruction, and lower the power level of the operably connected antenna 120. The antenna 120 may transmit radio frequencies according to the LTE, WiFi, WiGIG, Bluetooth, WLAN, WWAN, and/or WPAN standards. As described above, the FCC regulations require that antenna power levels be protected from first level hacking attacks, and the weakest point of attack for a first level hacking attack is the control registers accessible via the PCIe interface. The secure PCIe interface 314 provides a solution to this problem by only executing instructions provided by entities that can pass a cryptographic challenge/response exchange based on a randomly selected challenge number value stored by the antenna power management PCIe security system 132 operating within the network interface device 130 in the memory 104, which may be accessible by the network interface device 130 and the processor 102. The network interface device 130 in an embodiment may further comprise an NID memory 316 (volatile (e.g. random-access memory, etc.), nonvolatile (read-only memory, flash memory etc.) or any combination thereof), in which code instructions transmitting from the processor 102 over the Secure PCIe interface 314 may be stored and executed by the network interface device 130.

Figure 4:
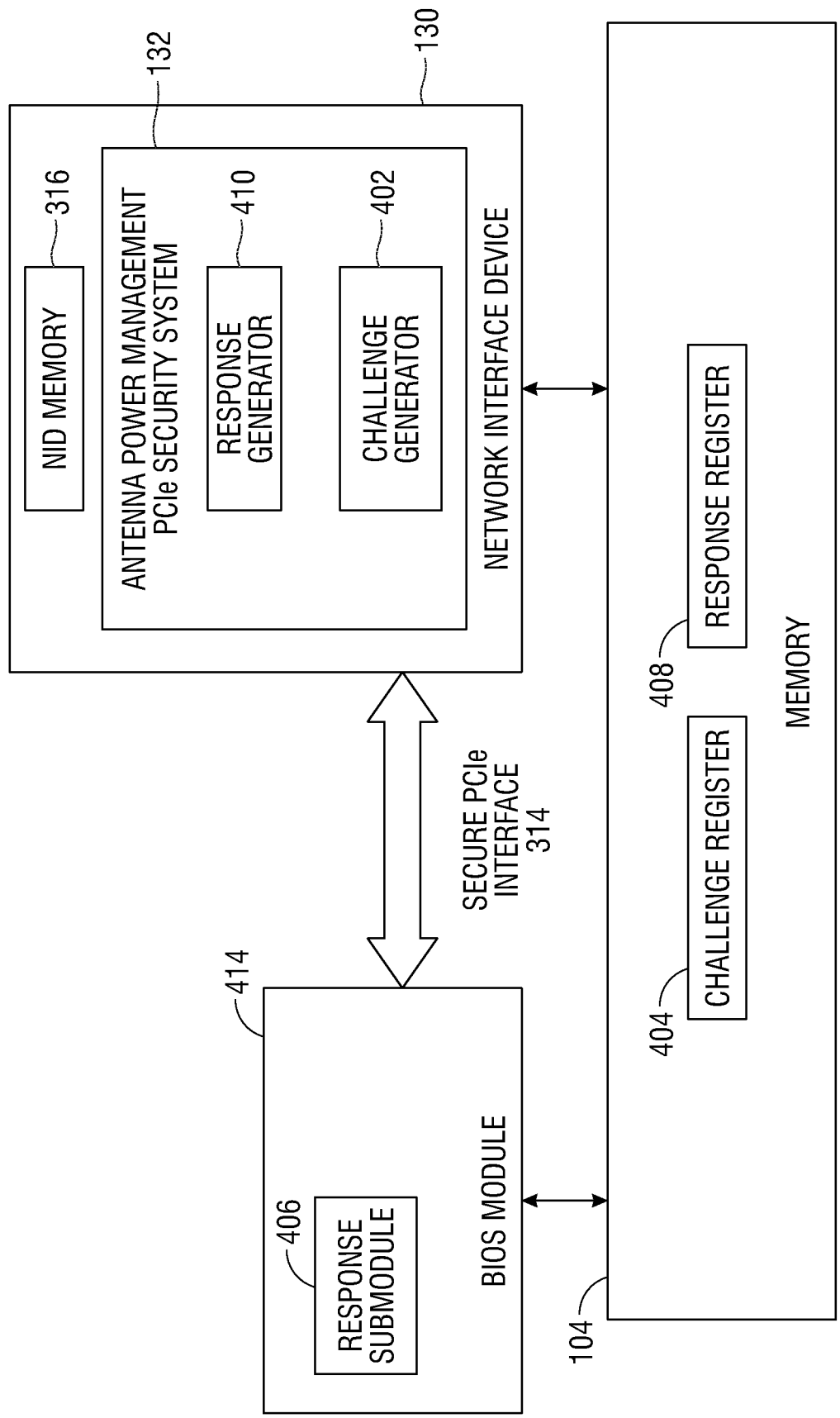
FIG. 4 is a block diagram illustrating an antenna power management PCIe security system according to an embodiment of the present disclosure.

FIG. 4 is a block diagram illustrating the antenna power management PCIe security system controlling access to a SAR control register according to an embodiment of the present disclosure. As described, the antenna power management PCIe security system 132 in an embodiment may meet the FCC requirements for protection of antenna power levels from first level hacking attacks by only executing instructions provided to the network interface device 130 from entities that provide a correct response value based on a randomly generated challenge number stored by the antenna power management PCIe security system 132 within the memory 104. In an embodiment, an antenna power management PCIe security system 132 operating within a network interface device 130 may include a challenge generator 402, capable of generating a long-string random number, and a response generator 410. The challenge generator 402 in an embodiment may operate to generate a long-string random number functioning as a challenge value, and store it in the challenge register 404. The response generator 410 in an embodiment may operate to perform a cryptographic method defined by a secret key stored at the antenna power management PCIe security system 132 to generate a response value. The antenna power management PCIe security system 132 in an embodiment may also operate to allow authorized modules or entities to transmit a single read/write function to the network interface device via the secure PCIe interface 314, and to store the received single read/write function to the SAR control register of the NID memory 316 for later execution by the network interface device 130.

The BIOS module 414 in an embodiment may instruct execution by the processor to initialize the information handling system on power up, to launch an operating system, and to manage input and output interactions between the operating system and the other elements of the information handling system. The BIOS module 414 may further include a response submodule 406 having access to the same secret key as the one stored at the antenna power management PCIe security system. In an embodiment, the BIOS module 414 may access the challenge register 404 to retrieve the challenge value stored there by the antenna power management PCIe security system. The response submodule 406 in an embodiment may then operate to perform the same cryptographic method used by the response generator 410, as defined by the secret key stored at both the antenna power management PCIe security system and the BIOS module 414 to generate a response value. If the secret key stored at both the antenna power management PCIe security system and the BIOS module 414 in an embodiment match, the cryptographic methods used by the response submodule 406 and the response generator 410 should similarly match. Further, if the response submodule applies this method to the challenge value generated by the challenge generator 402, then the response generated by the response submodule 406 should match the response generated by the response generator 410 in an embodiment. Upon generation of the response value by the response submodule 406, the BIOS module 414 in an embodiment may store that response with the response generated by the antenna power management PCIe security system in the response register 408. In an embodiment, if the response generated by the BIOS module 414 matches the response generated by the antenna power management PCIe security system 132, then the BIOS module 414 in an embodiment may also operate to transmit a single read/write function to the network interface device 130 via the secure PCIe interface 314.

The memory 104 in an embodiment may include a challenge register 404, and a response register 408. The memory 104 may be accessible by the network interface device 130, and by the BIOS module 414. The challenge register 404 in an example embodiment may operate to store the long-string random number generated by the random number generator 402, and in one example embodiment, may provide storage for long-string random numbers having a length of at least 128 bits. The response register 408 in an embodiment may operate to store response values generated by the response submodule 406 and the response generator 410, respectively. The antenna power management PCIe security system 132 in an embodiment may access these stored response values within the response register 408 to determine whether they match. The response values stored within the response register 408 in an embodiment may have a length of at least 128 bits. The length of the response values stored in an embodiment may depend upon the cryptographic method defined by the secret key and used by the BIOS module 414. Less complex cryptographic methods require greater response value lengths, and more complex cryptographic methods allow for smaller response value lengths. For example, the finite-field cryptographic method may require a 3072-bit response value, while the comparatively more complex elliptical curve cryptographic method allows for a 128-bit response value length. Because usage of the elliptical curve cryptographic method is specifically contemplated in an embodiment of the present disclosure, a response register allowing for storage of response values having a maximum length of only 128 bits are also specifically contemplated in an example embodiment.

The SAR control register within the NID memory 316 in an embodiment may comprise all instructions directing the power output of the transmitting antenna, and each of these instructions may be executed by the processor of the information handling system. The BIOS module 414 in an embodiment may transmit a received instruction to lower the power output of an operatively coupled transmitting antenna in response to detected presence of a human body part nearby, as described above, to the network interface device 130 via the Secure PCIe interface 314 after providing a correct authentication exchange within the response register 408 of the memory 104. The network interface device 130 in such an embodiment may store the received instruction to lower the power output of the operatively coupled transmitting antenna in the SAR control register of the NID memory 316, for later execution by the network interface device 130.

Figure 5:
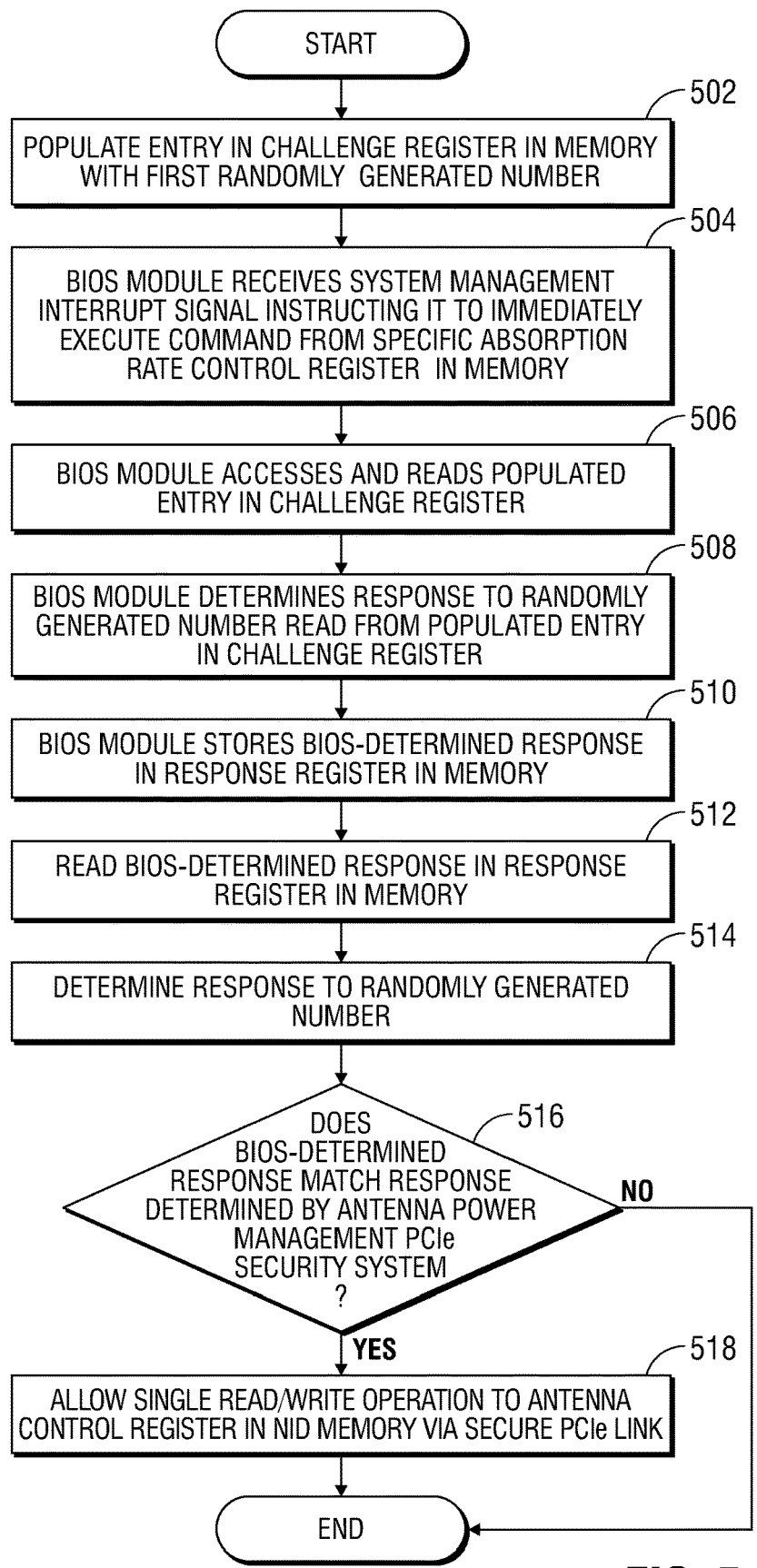
FIG. 5 is a flow diagram illustrating a method of allowing a single read/write operation to an antenna control register according to an embodiment of the present disclosure.

FIG. 5 is a flow diagram illustrating a method of allowing a single read/write operation to an antenna control register by an authorized BIOS module according to an embodiment of the present disclosure. As described, the antenna power management PCIe security system in an embodiment may meet the FCC requirements for protection of antenna power levels from first level hacking attacks by only executing instructions provided to the network interface device from entities that provide a correct response value based on a randomly generated challenge number created by and stored by the antenna power management PCIe security system within the memory. As shown in FIG. 5, at block 502, an antenna power management PCIe security system in an embodiment may populate an entry in a challenge register of the memory with a first randomly generated number. In an embodiment, an antenna power management PCIe security system operating within a network interface device 130 may include a random number generator, capable of generating a long-string random number. The antenna power management PCIe security system in an embodiment may store the randomly generated number within a challenge register of the memory, which may be accessible by the BIOS module.

At block 504, in an embodiment, the BIOS module may receive a system management interrupt signal instructing it to immediately execute a command from a specific absorption rate (SAR) control register in the memory. As described above, when a human body part comes into close proximity with the proximity sensing strip of the information handling system, the presence of the body part may change the local electric field of the proximity sensing strip, which may also alter the mutual capacitance across the proximity sensor. The sensor integrated circuit coupled to the proximity sensor in an embodiment may detect such alterations in the mutual capacitance across the proximity sensor, and may transmit instructions to the BIOS/FW of the information handling system via the embedded controller to decrease the power level supplied to the transmitting antenna in response. In such a way, the proximity sensor integrated circuit in an embodiment may ensure compliance with FCC regulations directing power adjustments for output of transmitting antennas in the presence of human body parts.

At block 506, in an embodiment, the BIOS module may access and read the populated entry in the challenge register. The BIOS module in an embodiment may access the memory in order to read the randomly generated challenge number generated by the challenge generator of the antenna power management PCIe security system and stored in the challenge register by the antenna power management PCIe security system.

At block 508, in an embodiment, the BIOS module may determine a response to the randomly generated number read from the populated entry in the challenge register. The BIOS module in an embodiment may further comprise a response generation module, which may perform a pre-set function on the value of the randomly generated challenge number retrieved from the challenge register, as defined by a secret key stored at both the BIOS module and the antenna power management PCIe security system to determine a response value. The pre-set function may include any formula or function used in asymmetric cryptographic methods known in the art. In an example embodiment, the response generation module may apply an elliptic curve cryptographic (ECC) method to the randomly generated challenge number retrieved from the challenge register in order to determine a BIOS module response value. In other embodiments, other cryptographic methods may be employed, including, but not limited to RSA public-key encryption, SHA 256 encryption, and any other encryption or cryptographic methods currently existing, or yet to be developed.

At block 510, in an embodiment, the BIOS module may store the BIOS-determined response in the response register in the memory. For example, the BIOS module in an embodiment may store in the response register response values determined by the response submodule within the BIOS module by applying the pre-set function defined by the secret key stored at the BIOS module and the antenna power management PCIe security system to the randomly generated challenge value created by the antenna power management PCIe security system, stored at the challenge register, and retrieved by the BIOS module. At block 512, in an embodiment, the antenna power management PCIe security system may read the BIOS-determined response in the response register in the memory. For example, the antenna power management PCIe security system in an embodiment may read the response value determined by the response submodule within the BIOS module based on application of the pre-set function defined by the secret key stored at both the BIOS module and the antenna power management PCIe security system to the randomly generated challenge value generated by the antenna power management PCIe security system and stored at the challenge register.

At block 514, in an embodiment, the antenna power management PCIe security system may determine a response to the randomly generated number. The antenna power management PCIe security system in an embodiment may further include a response generator which may generate a response value by applying the same pre-set function as used by the response submodule of the BIOS module to the randomly generated challenge value created by the challenge generator of the antenna power management PCIe security system. As described above, the pre-set function may be defined by a secret key stored at both the BIOS module and the antenna power management PCIe security system. If the secret keys stored at the BIOS module and the antenna power management PCIe security system are identical, the pre-set functions used by the response submodule of the BIOS module and the response generator of the antenna power management PCIe security system should also be identical in an embodiment. Once the antenna power management PCIe security system in an embodiment has determined a response to the randomly generated challenge number in block 514, it may store that response in the response register of the memory.

At block 516, in an embodiment, the antenna power management PCIe security system may determine whether the BIOS-determined response matches the response determined by the antenna power management PCIe security system. The antenna power management PCIe security system in an embodiment may access the response register to compare the response stored there by the BIOS module to the response stored there by the antenna power management PCIe security system. As described above, if the secret keys stored at the BIOS module and the antenna power management PCIe security system are identical, then the pre-set functions used by the response submodule of the BIOS module and the response generator of the antenna power management PCIe security system should also be identical. Further, if the BIOS submodule successfully retrieves the randomly generated challenge variable stored at the challenge register by the antenna power management PCIe security system and the BIOS module and the antenna power management PCIe security system both apply the same pre-set function to the challenge variable, the BIOS module and the antenna power management PCIe security system should generate identical response values to one another in an embodiment. However, if the BIOS module and the antenna power management PCIe security system do not apply identical pre-set functions (e.g. the secret keys stored at the BIOS module and the antenna power management PCIe security system are not identical to one another), or the challenge variables to which the BIOS module and the antenna power management PCIe security system apply the pre-set function, respectively, are not identical, then the response variables generated by the BIOS module and the antenna power management PCIe security system in an embodiment may not match. This scenario may occur in the case of a malicious hacking attack targeting the control register accessible via the PCIe interface between the network interface device and the BIOS module. Thus, if the BIOS-determined response does not match the response determined by the antenna power management PCIe security system in an embodiment, the system may ignore the request to access the control register, and the antenna power management PCIe security system may deny SAR control register access to the entity attempting to control power output of the antenna. In such a way, the antenna power management PCIe security system may secure control of transmitting antenna power output from first-level hacking attempts.

At block 518, in an embodiment, the antenna power management PCIe security system may allow the BIOS module to perform a single read/write operation to the SAR control register via the secure PCIe link. If the response value generated and stored at the response register by the BIOS module matches the response value generated and stored at the response register by the antenna power management PCIe security system, the antenna power management PCIe security system may allow the BIOS module to transmit a single read/write operation directing the power output of the antenna to the network interface device via the secure PCIe interface, as described in greater detail above. The network interface device in an embodiment may later store the received single read/write operation within the SAR control register of the network interface device memory, for later execution by the network interface device, as described in greater detail below. By granting access to the SAR control register only after identifying the BIOS module as an authorized entity, the antenna power management PCIe security system may secure control of transmitting antenna power output from first-level hacking attempts.

Figure 6:
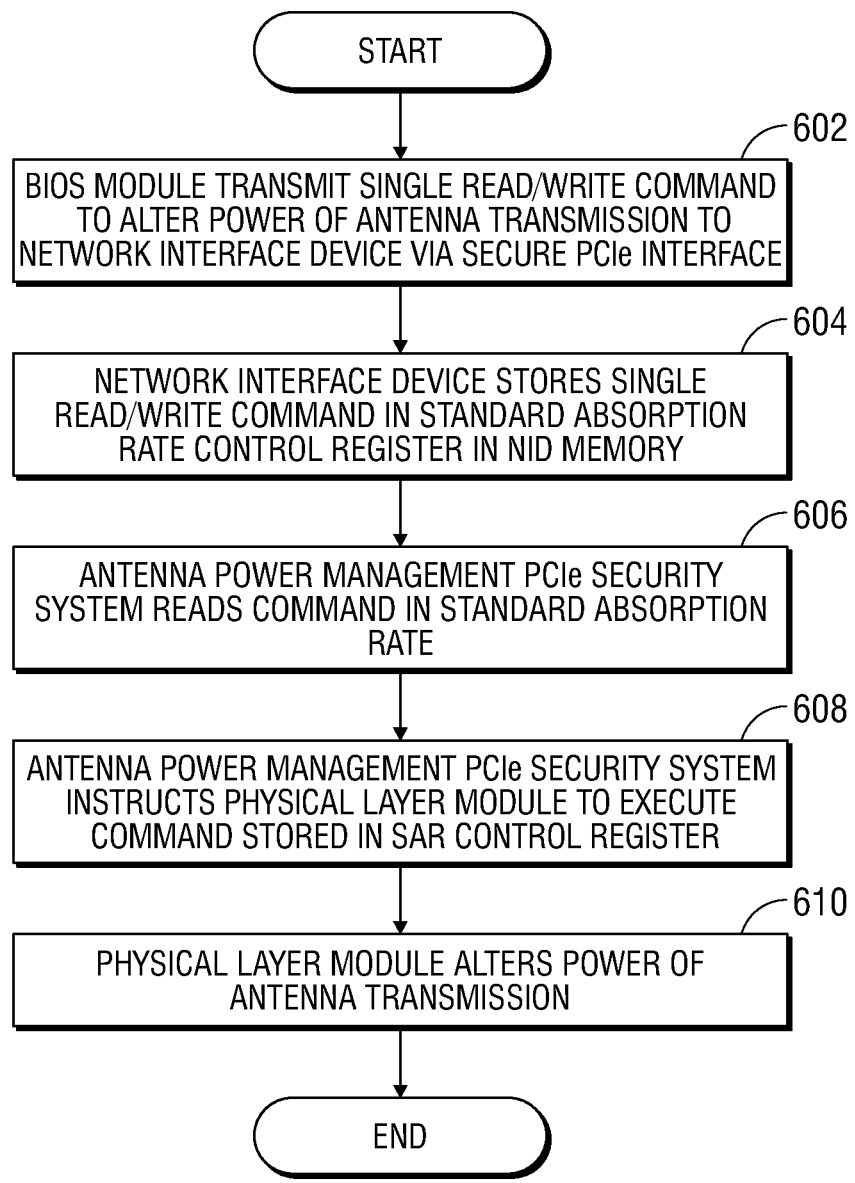
FIG. 6 is a flow diagram illustrating a method of altering the power output of a transmitting antenna according to an embodiment of the present disclosure.

FIG. 6 is a flow diagram illustrating a method of executing power management commands stored in a SAR control register to alter the power output of a transmitting antenna according to an embodiment of the present disclosure. At block 602, in an embodiment, the BIOS module may transmit a single read/write command to alter the power of the antenna transmission to the network interface device via the secure PCIe interface. As described above, the sensor integrated circuit coupled to the proximity sensor in an embodiment may detect an alteration in the mutual capacitance across the proximity sensor indicating the presence of a human body part nearby the transmitting antenna, and may transmit instructions to the BIOS/FW of the information handling system via the embedded controller to decrease the power level supplied to the transmitting antenna in response. Upon providing a correct secret key in the response register, as described directly above, the antenna power management PCIe security system in an embodiment, the BIOS/FW module may transmit the instructions to decrease the power level supplied to the transmitting antenna to the network interface device in the form of a single read/write command via the secure PCIe interface.

At block 604, in an embodiment, the network interface device may store the received single read/write command to alter the power of the antenna transmission in the SAR control register of the NID memory. As described above, the SAR control register in an embodiment may comprise all instructions directing the power output of the transmitting antenna, and each of these instructions may be executed by the processor of the information handling system at the direction of the network interface device.

At block 606, in an embodiment, the antenna power management PCIe security system may read the command stored in the SAR control register by the network interface device. In one example embodiment, an additional protection aspect may be implemented. In an example embodiment, if the BIOS module fails to transmit the command to the network interface device, and the command is not written into the SAR control register within a preset period of time after the antenna power management PCIe security system determined the secret key generated by the BIOS module matches the secret key generated by the antenna power management PCIe security system, as described above, the antenna power management PCIe security system in an embodiment may revoke the BIOS module's access to the SAR control registers.

At block 608, in an embodiment, the antenna power management PCIe security system may instruct a physical layer module to execute the command stored in the SAR control register. In an example embodiment, the antenna power management PCIe security system may instruct the physical layer module of the network interface device that a new command for immediate execution has been entered in the SAR control register, if the network interface successfully received and stored the single command to the SAR register within the preset time period. The physical layer module of the network interface device may operate to control the power level supplied to the transmitting antenna in an embodiment.

At block 610, in an embodiment, the physical layer module may alter the power supplied to the transmitting antenna. Upon reading the command stored in the SAR control register, the physical layer module of the network interface device may direct the processor of the information handling system to execute the command instruction, causing the power supplied to the transmitting antenna to be altered. In some example embodiments, the power supplied to the transmitting antenna is decreased in response to detected proximity of a human body part nearby a transmitting antenna, as described in greater detail above. In other example embodiments, the power supplied to the transmitting antenna may be increased in response to a lack of a detected proximity of a human body part nearby a transmitting antenna for a preset time period following detected proximity of a human body part nearby a transmitting antenna. By only executing the command to alter the power supplied to the transmitting antenna, as stored in the SAR control register during a preset time period following determination that the BIOS generated secret key matches the secret key generated by the antenna power management PCIe security system, the antenna power management PCIe security system in an embodiment may secure power management of the transmitting antenna against first level hacking attempts, in compliance with FCC regulations.

The blocks of the flow diagram of FIGS. 5 and 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor executing instructions of a basic input/output system (BIOS) module operatively connected to a network interface device standard absorption rate (SAR) antenna power control register via a peripheral component interconnect express electronic (PCIe) bus interface;
the processor executing code instructions for a read/write command for altering a power level of a transmission by an operably connected transmitting antenna according to SAR requirements in response to detection at a sensor indicating a change to transmission power levels is required; and
the PCIe bus interface secured by implementing a challenge/response cryptographic system between the BIOS module and the network interface device before allowing the read/write command to access the standard absorption rate control register at the network interface device, wherein the BIOS module and the network interface device may each access a copy of a secret key.

2. The information handling system of claim 1 further comprising:
the processor executing code instructions of the challenge/response cryptographic system to ignore attempts of the BIOS module to transmit the read/write command via the secured PCIe bus interface if the challenge/response cryptographic system does not yield a first response value matching a second response value.

3. The information handling system of claim 1 further comprising:
the processor executing code instructions of the BIOS module to receive the read/write command instruction to decrease a voltage supplied to the transmitting antenna in response to a change in capacitance sensed across a proximity sensing element.

4. The information handling system of claim 3 further comprising:
the BIOS module to transmit the read/write command to the standard absorption rate control register at the network interface device within the preset time period.

5. The information handling system of claim 1, wherein a first response value and a second response value are determined by the challenge/response cryptographic system based on a randomly generated number using an asymmetric cryptographic method.

6. The information handling system of claim 1, wherein a first response value and a second response value are determined by the challenge/response cryptographic system based on a randomly generated number using an elliptic curve cryptographic method.

7. The information handling system of claim 1, wherein a challenge register and a response register of a memory accessible by the challenge/response cryptographic system allow for storage of data records having a length of bits at a protocol-acceptable secure level.

8. A method of securing communication bus transmissions controlling antenna power output comprising:
- executing instructions, via a processor, of a basic input/output system (BIOS) module to prepare a power management command for altering a transmission power level of an operably connected transmitting antenna according to SAR requirements in response to detection at a sensor indicating a change to transmission power levels is required;
- implementing a challenge/response cryptographic system between the BIOS module and the network interface device, wherein the BIOS module and the network interface device may each access a copy of a secret key to secure a bus interface between the BIOS module and the network interface device; and
- transmitting, via the secured bus interface, the read/write command to a standard absorption rate control register at the network interface device.

9. The method of claim 8 further comprising:
ignoring attempts of the processor to transmit the power management command via the secure bus interface if a first response value does not match a second response value generated via the challenge/response cryptographic system.

10. The method of claim 8 further comprising:
executing the power management command stored in the standard absorption rate control register to alter transmission power level of the transmitting antenna.

11. The method of claim 10 further comprising:
receiving the power management command to alter a voltage supplied to the transmitting antenna in response to a change in capacitance sensed across a proximity sensing element from an operably connected integrated circuit.

12. The method of claim 8, wherein a first response value and a second response value are determined by the challenge/response cryptographic system based on a randomly generated challenge value using an asymmetric cryptographic method.

13. The method of claim 8, wherein the power management command includes a command to decrease the voltage supplied to the transmitting antenna.

14. The method of claim 8, wherein the bus interface is a PCIe bus interface.

15. An information handling system comprising:
- a PCIe bus interface operatively connecting a basic input/output system (BIOS) module at a processor to a network interface device;
- standard absorption rate (SAR) antenna power control register via a bus interface;
- the processor executing code instructions for the BIOS module to issue a power management command in response to detection at a sensor indicating a change to transmission power levels;
- a challenge/response cryptographic system implemented between the BIOS module and the network interface device wherein the BIOS module and the network interface device may each access a copy of a secret key to generate response values in a challenge register and a response register to secure the bus interface; and
- transmitting the power management command, via the secured bus interface, to a standard absorption rate control register at the network interface device for execution to alter transmitting power of an operatively connected antenna.

16. The information handling system of claim 15 further comprising:
the processor executing code instructions of the challenge/response cryptographic system to ignore attempts of the BIOS module to transmit the power management command via the secure bus interface if a first response value does not match a second response value.

17. The information handling system of claim 15 further comprising:
the processor executing code instructions of the BIOS module to receive the power management command to decrease a voltage supplied to the transmitting antenna in response to a change in capacitance sensed across a proximity sensing element.

18. The information handling system of claim 15 further comprising:
the processor executing code instructions to store the power management command in the standard absorption rate control register; and
execute the power management command for the operatively connected antenna.

19. The information handling system of claim 15, wherein a first response value in a challenge register and a second response value in a response register are determined based on randomly generated numbers using an elliptic curve cryptographic method.

20. The information handling system of claim 15, wherein the secure bus interface is a PCIe bus interface.

* * * * *